United States Patent
Hagen et al.

(10) Patent No.: US 10,728,268 B1
(45) Date of Patent: Jul. 28, 2020

(54) METHODS AND APPARATUS FOR INTRUSION PREVENTION USING GLOBAL AND LOCAL FEATURE EXTRACTION CONTEXTS

(71) Applicant: Trend Micro Incorporated, Tokyo (JP)

(72) Inventors: Josiah Dede Hagen, Round Rock, TX (US); Jonathan Edward Andersson, Round Rock, TX (US); Shoufu Luo, Austin, TX (US); Brandon Niemczyk, Hutto, TX (US); Leslie Zsohar, Austin, TX (US); Craig Botkin, Austin, TX (US); Peter Andriukaitis, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 182 days.

(21) Appl. No.: 15/949,299

(22) Filed: Apr. 10, 2018

(51) Int. Cl.
*H04L 29/06* (2006.01)
*G06N 5/04* (2006.01)
*G06N 20/00* (2019.01)

(52) U.S. Cl.
CPC ......... *H04L 63/1425* (2013.01); *G06N 5/047* (2013.01); *G06N 20/00* (2019.01)

(58) Field of Classification Search
CPC ............. H04L 63/1425; H04L 63/1433; H04L 63/1441; H04L 63/145; G06N 20/00; G06N 5/047
See application file for complete search history.

(56) References Cited

U.S. PATENT DOCUMENTS

| | | | |
|---|---|---|---|
| 7,561,572 B2* | 7/2009 | Robinson | H04L 43/50 370/329 |
| 8,689,349 B2* | 4/2014 | Sahita | G06F 21/6281 726/26 |
| 9,699,001 B2* | 7/2017 | Addanki | H04L 12/465 |
| 9,930,132 B2* | 3/2018 | Gupta | H04L 67/2842 |
| 2009/0094697 A1 | 4/2009 | Provos et al. | |
| 2012/0222087 A1 | 8/2012 | Huynh et al. | |
| 2017/0039484 A1 | 2/2017 | Niemczyk et al. | |
| 2018/0032917 A1 | 2/2018 | Hagen et al. | |
| 2018/0139142 A1 | 5/2018 | Chhabra et al. | |
| 2019/0108440 A1* | 4/2019 | Adib | G06N 7/005 |

* cited by examiner

*Primary Examiner* — Hosuk Song
(74) *Attorney, Agent, or Firm* — Okamoto & Benedicto LLP

(57) ABSTRACT

In one embodiment, local begin and end tags are detected by a network security device to determine a local context of a network traffic flow, and a local feature vector is obtained for that local context. At least one triggering machine learning model is applied by the network security device to the local feature vector, and the result determines whether or not deeper analysis is warranted. In most cases, very substantial resources are not required because deeper analysis is not indicated. If deeper analysis is indicated, one or more deeper machine learning model may then be applied to global and local feature vectors, and regular expressions may be applied to packet data, which may include the triggering data packet and one or more subsequent data packets. Other embodiments, aspects and features are also disclosed.

19 Claims, 4 Drawing Sheets

METHODS AND APPARATUS FOR INTRUSION PREVENTION USING GLOBAL AND LOCAL FEATURE EXTRACTION CONTEXTS

BACKGROUND OF THE INVENTION

1. Field of the Invention

The present invention relates generally to computer security, and more particularly to methods and apparatus for inspecting network traffic flows.

2. Description of the Background Art

Intrusion prevention systems operate as a "bump" in the wire that enforces network and security policy. This is markedly different from intrusion detection systems, which monitor network traffic often through log data. That is, an intrusion detection system operates on past data, whereas an intrusion prevention system typically operates in real-time. More particularly, an intrusion prevention system can protect network segments during an attack because it operates on current data. As part of a multi-layered system of defenses, intrusion prevention systems often form the outermost layer and first line of defense.

A network security device, such an intrusion prevention or detection system, may employ different approaches to inspect network traffic for malicious data. For example, a network security device may employ pattern matching to inspect network traffic. As another example, some intrusion detection systems perform network traffic inspection using machine learning techniques. However, machine learning is highly difficult to use by intrusion prevention systems because of the very substantial resources required to inspect high volumes of network traffic in real-time.

SUMMARY

In one embodiment, local begin and end tags are detected by a network security device to determine a local context of a network traffic flow, and a local feature vector is obtained for that local context. One or more triggering machine learning model is applied by the network security device to the local feature vector, and the result determines whether or not deeper analysis is warranted. In most cases, very substantial resources are not required because deeper analysis is not indicated.

If deeper analysis is indicated, a global feature vector may be obtained, and a data package including at least the local and global feature vectors may be generated. The data package may further include the triggering data packet and one or more subsequent data packets. One or more deeper machine learning model may then be applied to the feature vectors, and regular expressions may be applied to the packet data. The results determine whether the network traffic flow is benign or malicious. One or more security actions may then be performed, depending on network security policy. For example, the network traffic flow may be allowed to pass when the result indicates a benign flow, or the network traffic flow may be blocked when the result indicates a malicious flow.

These and other embodiments, aspects and features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

An intrusion prevention system is often deployed at the perimeter of a network or network segment, in-line with network traffic. Network traffic passes through the intrusion prevention system before proceeding further into the network. Accordingly, and to avoid or minimize latency, an intrusion prevention system is expected to operate as a real-time system. Even deep packet inspection must proceed quickly in order not to impede the flow of packets. Further complicating the speed requirement is the fact that an intrusion prevention system needs to track the network traffic and payloads for many (in the millions) different sessions or flows simultaneously.

An example commercially-available intrusion prevention system is the 7500NX intrusion prevention system from TREND MICRO TIPPINGPOINT. The 7500NX intrusion prevention system supports network traffic at 20 Gb/s, can handle 60,000,000 concurrent flows, and has less than 40 microseconds of latency per packet. The aforementioned data rates limit the amount of time that an intrusion prevention has to identify malicious traffic. High-performance intrusion prevention systems seek to avoid methods of inspection that impede network flow.

In general, intrusion prevention systems can match Internet Protocol (IP) addresses, host names, and Uniform Resource Locators (URLs) to known whitelists and block lists. Additionally, intrusion prevention systems can match byte sequences or strings within packet payloads to known malicious patterns. This matching can include application of regular expressions in order to match patterns more loosely. An intrusion prevention system may perform all of these operations with minimal state in a single pass over the traffic, in order to guarantee desired data rate and latency performance. As will be more apparent below, embodiments of the present invention may be incorporated into suitable new or pre-existing intrusion prevention systems.

Figure 1:
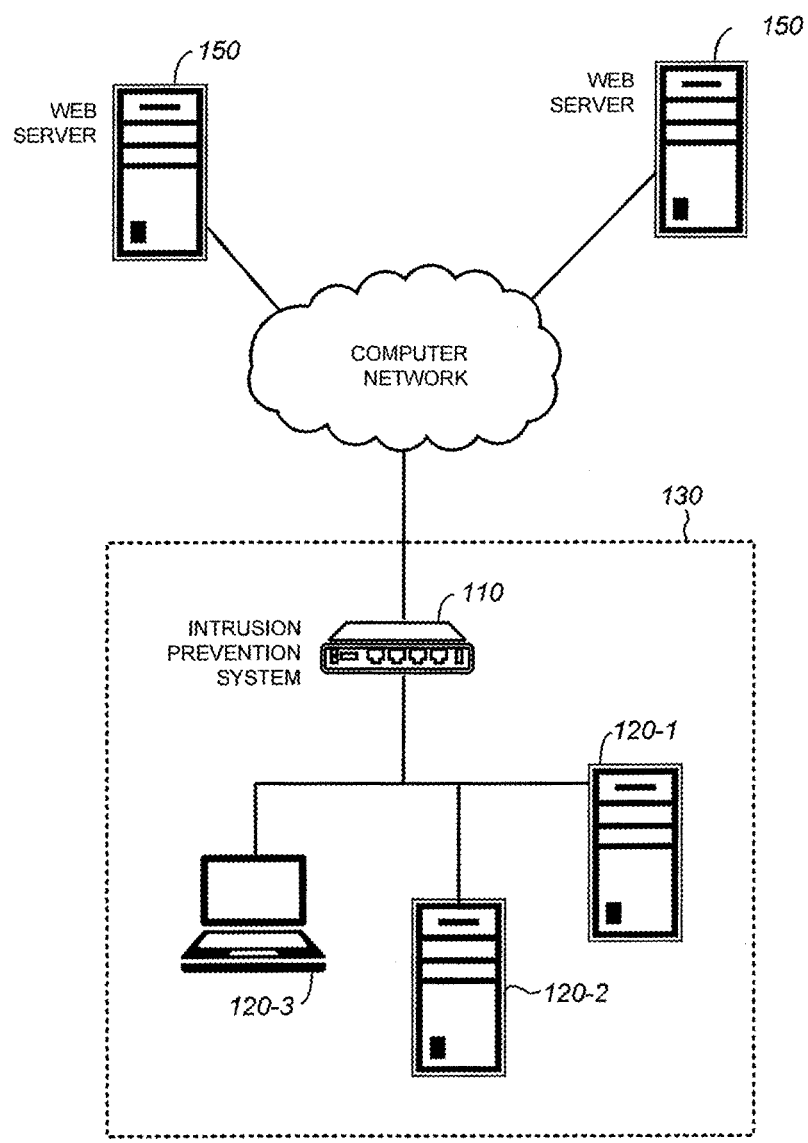
FIG. 1 is a logical diagram of a data network (or network segment) with an intrusion prevention system in accordance with an embodiment of the present invention.

FIG. 1 shows a logical diagram of a data network (or network segment) 130 with an intrusion prevention system (IPS) 110 in accordance with an embodiment of the present invention. In the example of FIG. 1, the perimeter of the computer network 130 is defended against malicious traffic by the IPS 110. The computer network 130 may include a plurality of network devices 120 (i.e., 120-1, 120-2, etc.), such as end user computers, servers, routers, etc. In one embodiment, the IPS 110 inspects all network traffic going into or out of the data network 130. For example, the IPS 110 may inspect packets communicated between an end user computer 120-3 of the data network 130 and a web server 150 on the Internet.

In one embodiment, the IPS 110 may be configured to inspect network traffic flows in real-time to look for various malware, including those created using exploit kits. Exploit kits provide attackers with dynamic threat platforms. Exploit kits are pre-engineered, commoditized software systems that allow attackers to deploy malicious payloads to target machines. Exploit kits are stealthy and designed to evade security measures by techniques such as HTML and javascript obfuscation. Every visit to an exploit kit landing page may produce a new instance of the page, with different obfuscated content than any previous version. These measures are taken by malicious actors in order to evade static signature detection (e.g. a cryptographic hash of the webpage) and regular expression detection of the landing page. For these reasons, machine learning techniques are used to detect the pattern of the obfuscation, rather than some specific or regular content.

Exemplary Method

Figure 2A:
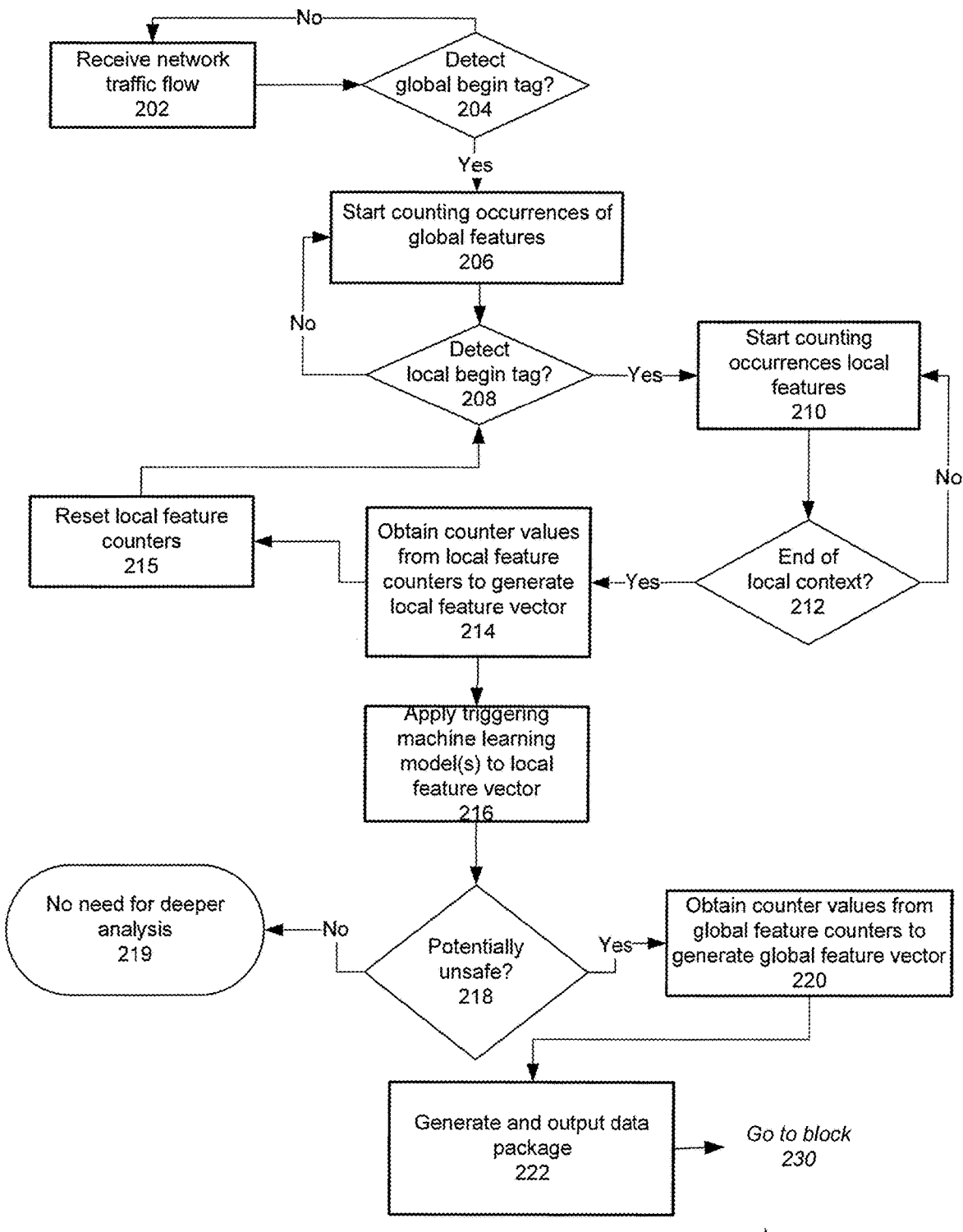
FIGS. 2A and 2B provide a flow diagram of an exemplary method of inspecting network traffic flows by a network security device in accordance with an embodiment of the present invention.
Figure 2B:
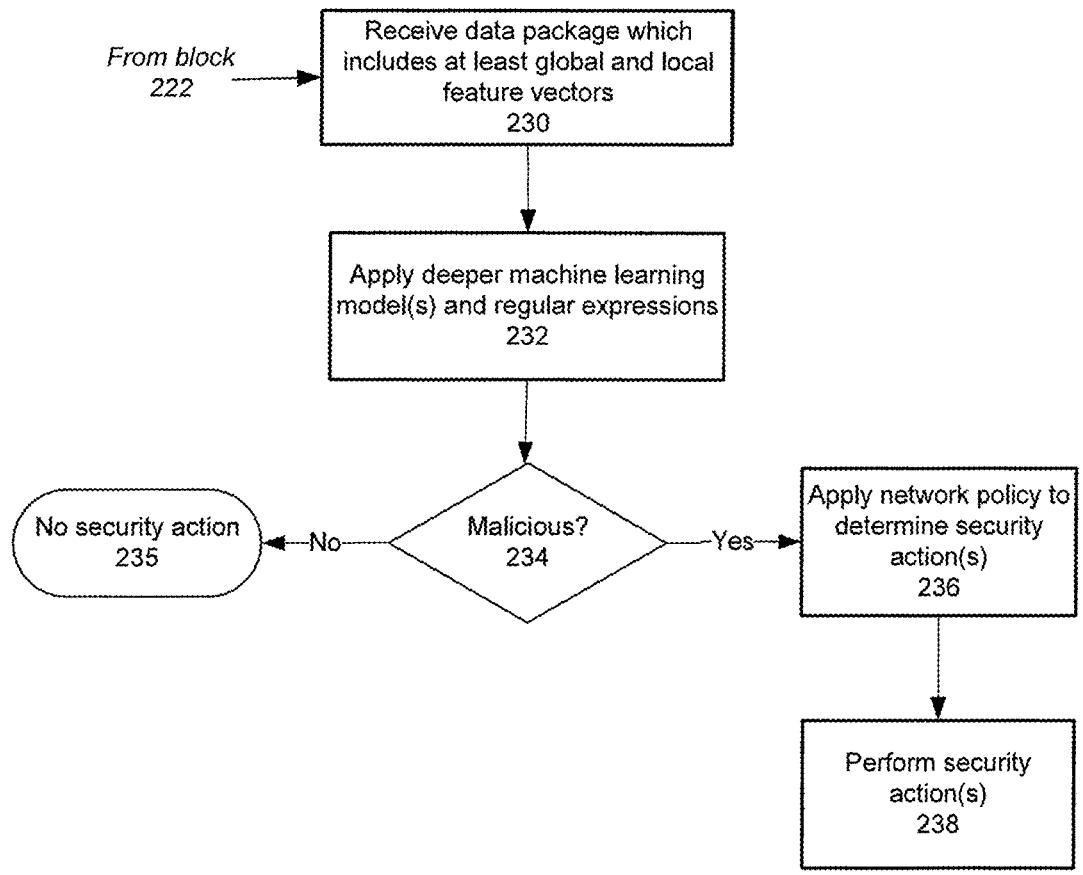

FIGS. 2A and 2B show a flow diagram of an exemplary method 200 of inspecting a network traffic flow by a network security device in accordance with an embodiment of the present invention. The method 200 may be performed in real-time using hardware circuitry in a network security device that scans a multitude of network traffic flows (i.e. live streams) in parallel. In an exemplary implementation, the network security device may be an intrusion prevention system 110, such as described above in relation to FIG. 1, and the hardware circuitry performing the method 200 may be a programmable integrated circuit, such as a field programmable gate array (FPGA), for example.

Referring to FIG. 2A, a data packet from a network traffic flow is received per block 202. The network traffic flow comprises a stream of data packets that are received by the network security device. As one example, the network traffic flow may comprise data packets received over a TCP/IP (transmission control protocol/internet protocol) connection by a web client from a web server.

The network traffic flow may be one of a multitude of active network traffic flows tracked by the device. For example, an intrusion prevention system for a large data network may receive packets which are part of a very large number of such network traffic flows at the same time. Thousands or millions of concurrent flows, each comprising many packets, may be tracked simultaneously by an intrusion prevention system.

Per block 204, a global begin tag is detected in the network traffic flow. The global begin tag may be in the form of a regular expression or pattern which may be searched. For example, the global begin tag may relate to a hypertext markup language tag (for instance, "<html").

Per block 206, upon detection of the global begin tag, occurrences of a plurality of global features are counted using global feature counters. In one embodiment, the plurality of global features includes statistics of various elements found in the network traffic flow. For example, the statistics of elements may include counts of various character classes, counts of various bi-character classes, and counts of one or more non-linguistic bigrams.

In an exemplary implementation, the global feature counters may include counters for the following elements.

7 counters for primary character classes (each character being one byte in length):
Is upper
Is lower
Is digit
Is punctuation
Is whitespace (printable characters remaining after excluding the above classes);
Is non-printable
Is high order (>x7F)

49 counters for bi-character classes: 2-byte combinations of the 7 primary character classes above. Cross packet combinations (i.e. 2-byte combinations that cross between two data packets) may be excluded.

6 counters for additional character classes:
ISO/IEC-2022 C1 control codes (Bytes 0x80 to x9F)
Valid for ISO/IEC-8859 (Bytes xA0 to xBF)
Two-byte UTF-8 (Bytes xC2 to xDF)
Three-byte UTF-8 (Bytes xE0 to xEF)
Four-byte UTF-8 (Bytes xF0 to xF4)
Invalid for UTF-8 (Bytes xC0, xC1, xF5 to xFF)

2 counters for non-linguistic (forbidden) bi-grams (case insensitive on alphabetic ASCII):
Initial bi-grams (upper or lower case character pair followed by punctuation or space; includes characters complementary to the interior bi-grams that are not the first bi-gram of an English word). In particular, these bi-grams may include:
'bf', 'bg', 'bj', 'bm', 'bn', 'bp', 'bv', 'cb', 'cd', 'ck', 'cq', 'dk', 'dp', 'fb', 'ff', 'fm', 'gb', 'gf', 'gg', 'gk', 'gs', 'hb', 'hf', 'hh', 'hk', 'hm', 'hn', 'hv', 'iq', 'kd', 'kf', 'kg', 'kk', 'kp', 'lf', 'lk', 'lm', 'lp', 'lq', 'ls', 'lt', 'lz'r, 'mf', 'mj', 'mv', 'nb', 'nc', 'nf', 'nh', 'nk', 'nl', 'nm', 'nq', 'nt', 'nv', 'nw', 'nx', 'nz', 'pc', 'pd', 'pj', 'rd', 'rj', 'rk', 'rl', 'rn', 'rp', 'rq', 'rt', 'rz', 'td', 'tf', 'tg', 'tk', 'tq', 'tt', 'tv', 'ue', 'uj', 'uo', 'uq', 'uw', 'uy', 'vs', 'wb', 'wc', 'wd', 'wf', 'wg', 'wm', 'wn', 'wp', 'ws', 'wt', 'ww', 'wz', 'xb', 'xf', 'xh', 'xl', 'xp', 'xs', 'xt', 'xw', 'yd', 'yk', 'yn', 'ys', 'yv', 'yx', 'yz', 'zz'

Interior bi-grams. In particular, these bi-grams may include:
'bq', 'bx', 'bz', 'cf', 'cg', 'cj', 'cv', 'cw', 'cx', 'dq', 'dx', 'fj', 'fk', 'fq', 'fv', 'fx', 'fz', 'gj', 'gq', 'gv', 'gx', 'gz', 'hj', 'hq', 'hx', 'hz', 'jb', 'jc', 'jd', 'jf', 'jg', 'jh', 'jj', 'jk', 'jl', 'jm', 'jn', 'jp', 'jq', 'jr', 'js', 'jt', 'jv', 'jw', 'jx', 'jy', 'jz', 'kq', 'kx', 'kz', 'lj', 'lx', 'mq', 'mx', 'mz', 'pq', 'pv', 'px', 'cg', 'pz', 'qa', 'qb', 'qc', 'qd', 'qe', 'qf', 'qg', 'qh', 'qi', 'qj', 'qk', 'ql', 'qm', 'qn', 'qo', 'qp', 'qq', 'qr', 'qs', 'qt', 'qv', 'qw', 'qx', 'qy', 'qz', 'rx', 'sx', 'sz', 'tx', 'vb', 'vc', 'vd', 'vf', 'vg', 'vh', 'vj', 'vk', 'vl', 'vm', 'vn', 'vp', 'vq', 'vt', 'vw', 'zc', 'zd', 'zf', 'zg', 'zh', 'zj', 'zk', 'zm', 'zn', 'zp', 'zq', 'zr', 'zs', 'zt', 'zv', 'zw', 'zx'.

The above enumerated counters provide one example implementation of a set of global feature counters. Other implementations of a set of global feature counters may include counters for other element or different elements.

The global begin tag marks the start of a global context. The global feature counters hold cumulative counts of the global features during the global context. The global context may last until the end of the network traffic flow. The global feature counters are reset between global contexts.

Per block 208, a local begin tag is detected in the network traffic flow. The local begin tag marks the start of a local context and may be in the form of a regular expression or pattern which may be searched. For example, the local begin tag may comprise the character "<" or the character string "<".

Per block 210, upon detection of the local begin tag, a local context is begun and so occurrences of a plurality of local features are counted using local feature counters. In one embodiment, the plurality of local features includes statistics of various elements found in the network traffic flow. For example, the statistics of elements may include counts of various character classes, counts of various bi-character classes, and counts of one or more non-linguistic bigrams. The elements counted for the local features may be the same as, or may differ from, the elements counted for the global features.

Per block 212, a determination is made to end the local context. In one implementation, the local context is ended when a local end tag is detected in the network traffic flow. The local end tag marks the end of a local context and may be in the form of a regular expression or pattern which may be searched. For instance, the local end tag may comprise the character "<" or the character string "<,". In another implementation, the local context is ended when a predetermined number of bytes after the local begin tag have been consumed (received and processed). In another implementation, the local context is ended when a local end tag is detected and a sufficiently large number of bytes (more than a predetermined number of bytes) have been consumed.

Per block 214, upon the ending of the local context, counter values are obtained from the plurality of local feature counters so as to obtain a local feature vector. The local feature vector thus reflects the statistics of the elements during the local context which begins at the detection of the local begin tag and ends when the criterion (or criteria) to end the local context is (are) met.

In one embodiment, the plurality of local features includes statistics of various elements found in the network traffic flow. For example, the statistics of elements may include counts of various character classes, counts of various bi-character classes, and counts of one or more non-linguistic bigrams. In an exemplary implementation, the local feature counters may include counters for the same elements as the global feature counters. Following the above-discussed example of a set of global feature counters, an example set of local feature counters may include: 7 counters for primary character classes (each character being one byte in length); 49 counters for bi-character classes which are 2-byte combinations of the 7 primary character classes; 6 counters for additional character classes; and 2 counters for non-linguistic (forbidden) bi-grams. Other implementations of a set of local feature counters may include counters for other element or different elements.

Per block 215, after obtaining the local feature vector, the local feature counters are reset to zero. The method 200 may then loop back to block 206 so as to detect a next local begin tag. Subsequently, upon detection of the next local begin tag, accumulation of counts to form the next local feature vector would then begin per block 210.

Regarding the just completed local context, per block 216, at least one triggering machine learning model is applied to the local feature vector that was obtained. In an exemplary implementation, a triggering machine learning model which is a linear model may be applied. Other forms of machine learning models may also be applied.

Each triggering machine learning model may have been previously generated by machine learning during a training phase. This training phase may be performed offline in a backend system, which may be separate from the IPS 110.

By training with known, i.e., labelled data, machine learning allows for generation of models that can classify new data according to these labels. Using a corpus of benign and malicious samples in the training phase, the triggering machine learning model may be generated.

A linear implementation of a machine learning model may be represented as, $C0+C1x1+C2x2+C3x3$, etc., where $C0$, $C1$, $C3$, etc. represent model coefficients and $x1$, $x2$, $x3$, etc. represent model features. By training with labeled samples, the values of the model coefficients for corresponding model features may be found. For example, the samples may be labeled as benign or suspicious (not benign). The model coefficients serve as weights for the corresponding model features. For a particular feature vector, the weighted features may be added together to generate a sum, a bias may be subtracted from the sum, and the biased sum may be compared to see whether or not it is greater than zero in order to classify the collected data stream.

After the triggering machine learning model(s) is (are) trained, it (they) may be applied to a local feature vector to classify a corresponding local segment of the network traffic flow as being safe or potentially unsafe. The application of the triggering machine learning model(s) may be performed in real-time at the IPS 110.

Per block 218, as a result of the application of the triggering machine learning model(s) to the local feature vector, a determination is made as to whether the corresponding portion of the network traffic flow is safe or potentially unsafe. In the former case, there is no need to make a deeper analysis per block 219 and so the packets of the flow may be allowed to be sent to their destination in the protected network 130. In the latter case, a deeper analysis is needed, so the method 200 moves forward to block 220.

When multiple triggering machine learning models are used, the network traffic flow may be determined to be safe when all of the triggering machine learning models evaluate to a negative or false (due to the evaluation being less than the bias). On the other hand, the network traffic flow may be determined to be potentially unsafe when any of the applied triggering machine learning models evaluate to a positive or true (due to the evaluation being greater than the bias).

Per block 220, upon determining that the corresponding portion of the network traffic stream is potentially unsafe, counter values are obtained from the plurality of global feature counters so as to obtain a global feature vector. The global feature vector will be used during application of the deeper machine learning model(s) which, in effect, performs a deeper analysis of the network traffic stream than the triggering machine learning model(s).

Per block 222, a data package is generated and output to a system for deeper analysis. Upon receiving the data package, the system for deeper analysis may perform the steps depicted in FIG. 2B. The data package that is generated includes at least the local and global feature vectors, as obtained in blocks 214 and 220, respectively. In an exemplary implementation, the data package further includes the data packet that produced the local begin tag, and one or more subsequently received data packets.

Referring to FIG. 2B, the data package is received by the system for deeper analysis per block 230. In an exemplary implementation described below in relation to FIG. 3, the system for deeper analysis may be implemented using a processor-based system which is embedded in the same integrated circuit as that which performs the steps depicted in FIG. 2A.

Per block 232, the system for deeper analysis performs its further analysis. In an exemplary implementation, the further analysis applies regular expressions to the data packets in the data package and also applies a deeper machine learning model or models to the local and global feature vectors in the data package. In an exemplary implementation, the deeper machine learning model may be a linear model. Other forms of machine learning models may also be used.

Like the triggering machine learning model(s), the deeper machine learning model(s) has (have) been previously generated by machine learning during a training phase. This training phase may be performed offline in a backend system, which may be separate from the IPS 110. By training with known, i.e., labelled data, machine learning allows for generation of models that can classify new data according to these labels. For example, using benign and malicious samples in the training phase, a deeper machine learning model may be generated. As another example, a single class (for example, of benign traffic or malicious traffic) may be used to train a deeper machine learning model. As another example, a single class of benign traffic may be used to train a first deeper machine learning model and a single class of malicious traffic may be used to train a second deeper machine learning model.

Subsequently, the deeper machine learning model(s) may be applied by the IPS 110 to a data package to perform a deeper classification the local segment of the network traffic flow as being benign or malicious. The application of the deeper machine learning model or models to the data package may take more time and/or use greater resources than the application of the triggering machine learning model(s) to the local feature vector.

In an exemplary implementation, the triggering and deeper machine learning models may be trained to detect malware of a particular exploit kit that works in conjunction with a web page (e.g., the ANGLER exploit kit). In that case, the training may use benign samples which comprise samples of known benign web pages of legitimate websites and may use malicious samples that comprise samples of web pages that are known to be landing pages of the exploit kit.

Per block 234, as a result of the application of the regular expressions and the deeper machine learning model(s), a determination is made as to whether the local segment of the network traffic flow, in the context of the entire (global) network traffic flow, is benign or malicious. In the former case, there is no security action is needed per block 235 (although data regarding the traffic flow that resulted in this benign conclusion may still be logged). As such, the IPS 110 may allow packets from the network traffic flow to enter the network or network segment being protected so as to proceed to their destination. In the latter case, a security action is needed, so the method 200 moves forward to block 236.

Per block 236, based on the malicious result, the IPS 110 may apply a network policy to determine one or more security action(s). The security action(s) is (are) performed in block 238.

For example, a security action may block the network traffic flow when the deeper machine learning model(s) indicates that the network traffic flow is malicious. Blocking the network traffic flow may include preventing the network traffic flow from propagating in the computer network, preventing the network traffic flow from being received by a computer in the computer network, or other ways of stopping the network traffic flow from harming the computer network. Blocking the network traffic flow may also involve quarantining a particular host or IP address by preventing any traffic to or from that host or address. An additional security action may be involve logging data relating to the identified traffic flow.

In an exemplary implementation, the action(s) taken as a result of the deeper analysis may include: 0) permit; 1) notify; 2) block; and 3) quarantine. The permit action corresponds to step 235 in FIG. 2B. For the permit action, no security action is taken, and the data packets for the flow are allowed to pass to their destination. The notify, block and quarantine actions correspond to step 236 in FIG. 2B. For the notify action, the event is logged. The notify action may be taken in conjunction (or not) with any of the other actions. For the block action, the offending packet and subsequent packets in the flow are stopped from proceeding to their destination. For the quarantine action, communications to and from a particular IP address, or IP address and port combination, may be shut down.

In summary, the above-described method 200 detects local begin and end tags to determine a local context of a network traffic flow, and a local feature vector is obtained for that local context. A first (triggering) machine learning model (or models) is (are) applied to the local feature vector, and the result determines whether or not deeper analysis is warranted. In most cases, very substantial resources are not required because deeper analysis is not indicated.

If deeper analysis is indicated, a global feature vector may be obtained, and a data package including at least the local and global feature vectors may be generated. The data package may further include the triggering data packet and one or more subsequent data packets. A second (deeper analysis) machine learning model or models may then be applied to the feature vectors, and regular expressions may be applied to the packet data. The results determine whether the network traffic flow is benign or malicious. One or more security actions may then be performed, depending on network security policy. For example, the network traffic flow may be allowed to pass when the result indicates a benign flow, or the network traffic flow may be blocked when the result indicates a malicious flow.

Illustrative Example of Method in Operation

A simplified example of the method 200 in action is described below for illustrative purposes. In this example, it may be assumed that once a packet has passed through, it is gone forever; no more inspection of that packet may occur. This means that the inspection occurs in real time.

Suppose the following are features that are tracked for use in the local feature vector and/or the global feature vector:
L: lowercase letters;
U: uppercase letters;
S: (same) upper-upper character pairs or lower-lower character pairs; and
D: (different) upper-lower character pairs or lower-upper character pairs Further, suppose the following parameters:
packet size of 32 bytes; and
local feature collection and evaluation context of 16 bytes.

This means that there will be two local contexts (local context 1 and local context 2) for each packet in this simplified example. In other words, the beginning of a packet demarcates the beginning of a local context, the $16^{th}$ byte in the packet demarcates the end of a local context, the $17^{th}$ byte in the packet demarcates the beginning of a local context, and the last byte of the packet demarcates the end of a local context. This byte-count based definition of a local context is used to simplify this illustrative example. As described above, the local context in an exemplary implementation may be defined using a local begin tag and a local end tag.

Further suppose the linear "trigger" model (i.e. the triggering machine learning model) for local feature vector is the following:

3L+2S−50, which needs to be positive to trigger.

This means the trigger model needs 3L+2S>50 in order to "trigger" and send both global and local feature vectors on for deeper inspection.

Consider the following as data packets received in our illustrative example.

Packet1
The Quick Brown Fox Jumps Over T
Packet2
aBaBaBaBaBaBaBaBccccccccDDDDDDDD
Packet3
zzzzzzzzzzzzzzzzzzzzzzzzzzzzzzzz. The following is what occurs according to our method. Note that whitespace and punctuation are ignored as features. Note also that the feature values of the global feature vector start off at zero before Packet-1 and that the feature values for the local feature vector are reset between local contexts.

Packet-1, local context 1
Characters Received: "the Quick Brown".
Features in this local context are L=10, U=3, S=7, D=3. The 10 lowercase letters are: h; e; u; l; c; k; r; o; w; and n. The 3 uppercase letters are: T; Q and B. The 7 upper-upper or lower-lower character pairs are: he; ui; ic; ck; ro; ow; and wn. The 3 upper-lower or lower-upper character pairs are: Th; Qu; and Br.

Local feature vector is L=10 and S=7, so the model evaluates to 3L+2S=30+14=44≤50, so no trigger occurs.

Global feature vector (if it were output) is L=10, U=3, S=7, D=3.

Packet-1, Local Context 2
Characters received: "Fox Jumps Over T".
Features in this local context are L=9, U=4, S=6, D=3. The 9 lowercase letters are: o; x; u; m; p; s; v; e; and r. The 4 uppercase letters are: F; J; O and T. The 6 upper-upper or lower-lower character pairs are: ox; um; mp; ps; ve; and er. The 3 upper-lower or lower-upper character pairs are: Fo; Ju; and Ov.

Local feature vector is L=9 and S=6, so the model evaluates to 3L+2S=27+12=39≤50, so no trigger occurs.

Global feature vector (if it were output) is L=19, U=7, S=13, D=6.

Packet-2, Local Context 1
Characters received: "aBaBaBaBaBaBaBaB".
Features in this local context are L=8, U=8, S=0, D=16. The 8 lowercase letters are each "a". The 7 uppercase letters are each "B". There are no upper-upper or lower-lower character pairs. The 16 upper-lower or lower-upper character pairs include the Ta character pair from Packet-1 to Packet-2, 8 aB pairs and 7 Ba pairs.

Local feature vector is L=8 and S=0, so the model evaluates to 3L+2S=24+0=50, so no trigger occurs.

Global feature vector (if it were output) is L=27, U=15, S=13, D=22.

Packet-2, Local Context 2
Characters received: "ccccccccDDDDDDDD".
Features in this local context are L=8, U=8, S=14, D=2. The 8 lowercase letters are each "c". The 7 uppercase letters are each "D". The 14 upper-upper or lower-lower character pairs include 7 cc pairs and 7 DD pairs. The 2 upper-lower or lower-upper character pairs include the Bc pair from the transition from local context 1 to local context 2 and the cD pair.

Local feature vector is L=8 and S=15→model evaluates to 3L+2S=24+30=54>50, causing a trigger to occur.

Global feature vector (if it were output) is L=35, U=23, S=27, D=24.

Packet-2, local context 2 features caused the biased sum of the model to evaluate to a positive number, causing a trigger to occur. As a result of the trigger occurring, the hardware circuitry that applies the triggering machine learning model may generate a data package and send it to a processor-based system for deeper inspection.

The data package sent may include, in this example:
the current packet: Packet-2;
any subsequent packets in the flow (e.g. Packet-3, and so on);
the current local features: L=8, U=8, S=15, D=1; and
the global feature vector: L=35, U=23, S=27, D=24.

Subsequently, the processor-based system may perform a deeper inspection. In an exemplary implementation, the processor-based system may apply regular expressions to Packet-2 and subsequent packets that hardware passed on. In addition, the processor-based system may apply a deeper machine learning model or other model to the local and global feature vectors that hardware passed on.

The processor-based system may thus make the determination on whether or not the flow appears benign or malicious. If the flow appears benign, then it may be allowed to pass. If the flow appears malicious, then a network policy may be applied to determine a security action or actions to apply, such as blocking the flow.

Exemplary Apparatus

Figure 3:
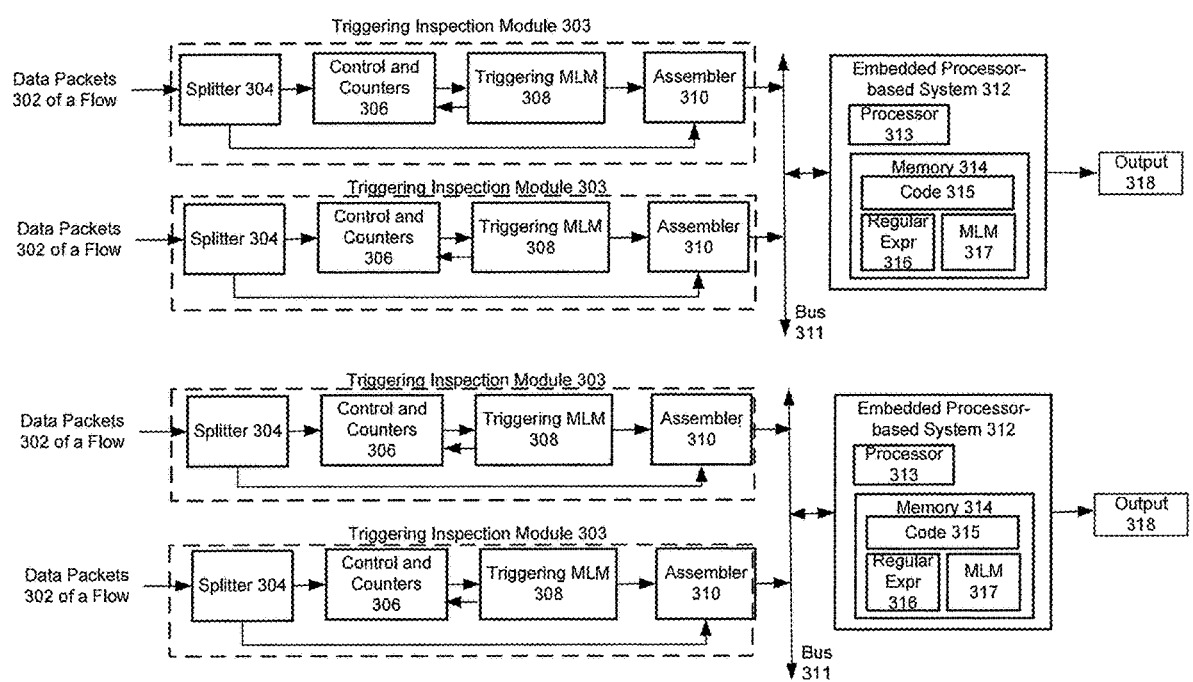
FIG. 3 is a block diagram of exemplary apparatus for implementing the method which may be incorporated into a network security device in accordance with an embodiment of the present invention.

FIG. 3 is a block diagram of an exemplary apparatus 300 for implementing the method which may be incorporated into a network security device in accordance with an embodiment of the present invention. The apparatus 300 may be implemented in hardware circuitry on a field programmable gate array (FPGA) or other programmable integrated circuits.

The apparatus 300 may include an array of triggering inspection modules 303 which are applied to triage network traffic flows. As depicted, each triggering inspection module 303 may receive data packets 302 of a network traffic flow and may include a splitter circuit 304, a control and counters circuit block 306, a triggering machine learning model (MLM) circuit block 308, and an assembler circuit block 310. In addition, the further circuit modules may include a plurality of embedded processor-based systems 312.

The splitter circuit 304 receives the data packets of a network traffic flow, including payload and control bits. Each splitter circuit 304 may output the packets to both a corresponding control and counters circuit block 306 and to a corresponding assembler circuit block 310.

The control and counters circuit block 306 receives the packets from the splitter circuit 304. Each control and counters circuit block 306 includes detection circuitry to detect specified tags in the packets. In particular, the detection circuitry may be configured to detect the global begin tag, local begin tag, and local end tag, as described above. Each control and counters circuit block 306 further includes counters for counting global and local features. Exemplary implementations of a set of global features and a set of local features are described above.

Upon detection of a local end tag by the control and counters circuit block 306, local feature counts may be obtained to generate the local feature vector, and the local feature vector may be sent to the triggering machine learning model (MLM) circuit 308. The triggering MLM circuit 308 may then apply the triggering machine learning model(s) to the local feature vector as described above in relation to block 216 of FIG. 2A. If a trigger occurs, then the triggering MLM 308 may obtain the global feature counts from the control and counters circuit block 306 to generate the global feature vector, and the local and global feature vectors may be sent to the assembler circuit 310.

The assembler circuit 310 may be configured to generate the data package to be provided to a processor-based system which may perform a deeper analysis using instruction-coded program routines. The data package may include at least the local and global feature vectors. In addition, the data package may include the data packet that caused the trigger and one or more subsequent data packets in the network data flow. These data packets may be obtained by the assembler 310 from the splitter 304.

The assembler circuit 310 may send the data package to the processor-based system for deeper analysis. In an exemplary implementation, the processor-based system may be an embedded processor-based system 312 in that it is implemented using a processor 313 and memory 314 in the same FPGA (or other programmable integrated circuit). In the illustrated example, the data package may be sent via a data bus 311 to the embedded processor-based system 312.

The embedded processor-based system 312 may execute machine-readable instruction code 315 to apply regular expressions 316 and at least one deeper machine learning model (MLM 317). The regular expressions 316 may be matched against the content in the data packets in the data package received from the assembler 310. The MLM 317 may be applied to the local and global feature vectors in the data package received from the assembler 310.

As a result of the application of the regular expressions 316 and the MLM 317, a determination is made by the system 312 as to whether the local segment of the network traffic flow, in the context of the global network traffic flow, is benign or malicious. The result of this determination may be output via an output circuit 318 to other circuitry in the network security device.

Subsequently, the network security device (such as IPS 110) may apply a network security policy to the result to determine one or more security actions. The security action(s) may then be performed, such as letting the network traffic flow pass when the result indicates a benign flow or blocking the network traffic flow when the result indicates a malicious flow.

CONCLUSION

While specific embodiments of the present invention have been provided, it is to be understood that these embodiments are for illustration purposes and not limiting. Many additional embodiments will be apparent to persons of ordinary skill in the art reading this disclosure.

What is claimed is:

1. An integrated circuit configured to use hardware circuitry to inspect network traffic, the integrated circuit comprising:
an array of triggering inspection modules, each triggering inspection module in the array receiving a stream of data packets for a network traffic flow and each triggering inspection module comprising
first pattern matching circuitry for detecting a global begin tag in the network traffic flow,
a plurality of global feature counters for counting occurrences of a plurality of global features upon detection of the global begin tag,
second pattern matching circuitry for detecting a local begin tag in the network traffic flow so as to determine a start of a local context,
a plurality of local feature counters for counting occurrences of a plurality of local features upon detection of the local begin tag,
circuitry for determining an end of the local context,
local counter control circuitry for obtaining counter values from the plurality of local feature counters so as to obtain a local feature vector upon determination of the end of the local context; and
at least one triggering machine learning model that is applied to the local feature vector to determine whether deeper analysis is to be performed.

2. The integrated circuit of claim 1, wherein each triggering inspection module in the array further comprises
global counter control circuitry for obtaining counter values from the plurality of global feature counters so as to obtain a global feature vector upon determining that the deeper analysis is to be performed, and
output circuitry for outputting a data package including at least the global feature vector and the local feature vector to a system that applies at least one deeper machine learning model to the global and local feature vectors.

3. The integrated circuit of claim 1, wherein the local counter control circuitry resets the plurality of local feature counters after obtaining the local feature vector.

4. The integrated circuit of claim 1, wherein the triggering machine learning model is a linear model.

5. The integrated circuit of claim 1, wherein the integrated circuit comprises a field programmable gate array.

6. The integrated circuit of claim 1, wherein the end of the local context is determined by detecting a local begin tag in the network traffic flow, wherein the local begin tag comprises a regular expression.

7. The integrated circuit of claim 1, wherein the regular expression describes a hypertext markup language tag.

8. The integrated circuit of claim 1, wherein the plurality of local features comprises statistics of elements found in the local context.

9. The integrated circuit of claim 8, wherein the statistics of elements comprises counts of character classes and counts of bi-character classes.

10. The integrated circuit of claim 8, wherein the statistics of elements comprises at least one count of non-linguistic big rams.

11. A method of inspecting network traffic using hardware circuitry, the method comprising:
receiving data packets for a plurality of network traffic flows, each network traffic flow comprising a stream of data packets; and
inspecting each network traffic flow by
detecting a global begin tag in the network traffic flow,
upon detection of the global begin tag, counting occurrences of a plurality of global features using global feature vector counters,
detecting a local begin tag in the network traffic flow,
upon detection of the local begin tag, starting a local context and counting occurrences of a plurality of local features using local feature vector counters,
determining an end of the local context in the network traffic flow, upon determining the end of the local context, obtaining counter values from the plurality of local feature counters so as to obtain a local feature vector, and applying at least one triggering machine learning model on the local feature vector to determine whether deeper analysis is to be performed, wherein inspecting each network traffic flow further comprises, upon determining that the deeper analysis is to be performed:

obtaining counter values from the plurality of global feature counters so as to obtain a global feature vector;

sending a data package including at least the global feature vector and the local feature vector to a system that performs the deeper analysis; and applying one or more deeper machine learning models by the system to the global and/or local feature vectors.

12. The method of claim 11, wherein the data package further includes a data packet causing the trigger and one or more subsequent data packets in the network traffic flow, and wherein the system that performs the deeper analysis applies regular expressions or other analysis to said data packets.

13. The method of claim 11, wherein inspecting each network traffic flow further comprises resetting the plurality of local feature counters after obtaining the local feature vector.

14. The method of claim 11, wherein the at least one triggering machine learning model comprises a linear model.

15. The method of claim 11, wherein the hardware circuitry performing the method comprises a field programmable gate array.

16. The method of claim 11, wherein the end of the local context is determined by detecting a local begin tag in the network traffic flow, and the local begin tag comprises a regular expression.

17. The method of claim 11, wherein the plurality of local features comprises statistics of elements found in the network traffic flow.

18. A circuit module for inspecting a network traffic flow so as to trigger a deeper analysis, the circuit module comprising:

first pattern matching circuitry for detecting a global begin tag in the network traffic flow, a plurality of global feature counters for counting occurrences of a plurality of global features upon detection of the global begin tag, second pattern matching circuitry for detecting a local begin tag in the network traffic flow which starts a local context, a plurality of local feature counters for counting occurrences of a plurality of local features upon detection of the local begin tag, circuitry for determining an end of the local context, local counter control circuitry for obtaining counter values from the plurality of local feature counters so as to obtain a local feature vector upon determination of the end of the local context, and at least one triggering machine learning model that is applied to the local feature vector to determine whether the deeper analysis is to be performed.

19. The circuit module of claim 18 further comprising:

global counter control circuitry for obtaining counter values from the plurality of global feature counters so as to obtain a global feature vector upon determining that the deeper analysis is to be performed, and assembler circuitry for generating a data package including at least the global feature vector and the local feature vector and outputting the data package to a system that applies one or more deeper machine learning model to the global and local feature vectors.

* * * * *